Patented Feb. 14, 1950

2,497,458

UNITED STATES PATENT OFFICE 2,497,458

BUTADIENE-STYRENE COPOLYMER TACKIFIED WITH ISOOLEFIN-DIOLEFIN-STYRENE COPOLYMER

Stewart S. Kurtz, Jr., Merion, Pa., assignor to Sun Oil Company, Philadelphia, Pa., a corporation of New Jersey No Drawing. Application May 26, 1945,
Serial No. 596,099

3 Claims. (Cl. 260—45.5)

This invention relates to the use of synthetic hydrocarbon compositions prepared by polymerization of a three-component mixture comprising an iso-olefin of 4-6 carbon atoms having a double bond in the alpha position and a side chain in the beta position, an aliphatic 1,3-conjugated diolefin and an aryl-substituted vinyl compound. In its broader and more general aspects, the invention contemplates the preparation and the compounding with a synthetic rubber having aromatic rings in the molecules thereof of a variety of synthetic compositions differing to an extent in properties and characteristics. More particularly, the invention is concerned with the preparation of synthetic compositions having regulable plasticity and tack characteristics followed by compounding of the compositions with a synthetic rubber, as defined. This application is a continuation-in-part of Serial No. 487,817, filed May 20, 1943, now abandoned.

Within the overall scope of the invention, specific synthesis may entail the use of different specific hydrocarbon source material components as to each of the aforesaid three types which are to be present in any given polymerization operation. As to the required diolefin and aryl components, respectively, these may be selected with reasonable freedom of choice from the indicated classes of compounds. The permissible variance in the olefinic component of a given reaction mixture is more limited.

The attainment of the desired characteristics in the synthetic products is brought about by the proper choice of operating variables within the limits hereinafter defined. Of particular importance as factors controlling the nature and character of the compositions are the ratios of monomeric components, the type and quantity of catalyst, the polymerization temperature and the constituents in the reaction mixture. By appropriate selection of processing variables such as the above, certain characteristics of the final composition can be reasonably controlled or predetermined in order to obtain in any given synthesis a particularly desired composition having desired characteristics.

It is well recognized that natural rubber has superiority, as to certain physical characteristics, over so-called synthetic rubbers. For example, elastomers comprising butadiene-styrene copolymers prepared by the conventional emulsion polymerization process lack the tack or cohesiveness of natural rubber. Milling natural rubber causes an increase in tack and plasticity, whereas milling butadiene-styrene copolymers is not effective to the desired degree. Moreover, since they fail to soften or break down well, the butadiene-styrene copolymers are difficult to mill and also to process further after milling. Thus they are difficult to friction or calender into fabrics such as the cord fabrics used in the manufacture of tire carcasses, and they fail to perform properly in tubing operations as employed in manufacturing tire treads unless large quantities of softener, etc., are added.

It is believed by some authorities that natural rubber consists of "gel rubber" of relatively high molecular weight and poor solubility in benzene, petroleum ether or like solvents, and "sol rubber" of relatively low molecular weight and good solubility in such solvents. The "sol components" of natural rubber are regarded as effective in imparting tack and plasticity thereto. On milling natural rubber both the tack and plasticity increase due to the formation of more low molecular weight fragments. On the other hand, butadiene-styrene synthetics appear to be made up of copolymers having a fairly uniform, high molecular weight, and thus to be deficient in lower molecular weight components corresponding to "sol rubber." Milling the butadiene-styrene copolymers apparently fails to produce enough of the low molecular weight components to impart the desired tack and plasticity.

The present invention is based on the discovery that it is possible to copolymerize a three-component hydrocarbon mixture, including an iso-olefin of 4-6 carbon atoms having a double bond in the alpha position and a side chain in the beta position, an aliphatic 1,3-conjugated diolefin and an aryl-substituted vinyl compound, in proportion, manner and under conditions such that products of desired characteristics can be obtained which when compounded with synthetic rubber, having aromatic rings in the molecules thereof, will form a blend which on further treatment to form rubber or rubberized products will have certain desired properties and overcome certain prior art disadvantages referred to herein. Unless the proportions, manner and conditions, herein defined are employed, the products may vary considerably in character, ranging from a type resembling a viscous, sticky oil to a type resembling a hard thermoplastic resin. However, by following the prescriptions of the present invention a particularly useful intermediate type comprising vulcanizable rubbery materials or elastomers is obtained. Through proper adjustment of manufacturing conditions, these rubber-like products may be obtained either as relatively low molecular weight elastomers having properties and characteristics similar to those attributed to "sol type" rubber, or as relatively high molecular weight elastomers whose characteristics approach those attributed to the "gel type."

I have discovered that synthetic rubber of the butadiene-styrene type may be improved with respect to tack, plasticity and effective response to milling, and that such attributes may be regulated and controlled, by adjusting the proportion of relatively low molecular weight components in such synthetic rubber. This adjustment may be accomplished by adding to the butadiene-styrene copolymers the relatively low molecular weight elastomers of this invention, which are compatible with the butadiene-styrene copolymers and which accordingly impart desired characteristics to the synthetic rubber material being manufactured.

In order for two different types of elastomers to be suitable for compounding and vulcanizing together, two primary requirements should be met. Specifically, the different copolymers first should be physically compatible and secondly should be chemically compatible with respect to curing rate, i. e. should have approximately the same rate of cure. In order to meet the first requirement there must be sufficient similarity in the molecular structures of the two types of elastomers to ensure physical homogeneity of the vulcanized blend. Lacking such similarity, the copolymers on compounding and curing will fail to produce a homogeneous product. The second requirement is of importance in order for the two types of elastomers to have the same state of cure in the vulcanized product. With substantially different rates of cure, there is danger that the faster curing type of elastomer may become scorched before the other is cured sufficiently. By way of illustration of these two types of compatibility, so-called butyl rubber, which comprises the copolymers of isobutene and a small proportion of another unsaturated hydrocarbon such as butadiene, has a chemical structure sufficiently similar to that of natural rubber to be physically compatible therewith. However, butyl rubber possesses such a low degree of unsaturation that it cures at a much slower rate than natural rubber and for this reason is not suitable for compounding with the latter. On the other hand, butyl rubber is sufficiently different in chemical structure from butadiene-styrene copolymers to be physically incompatible therewith, and also has such a low degree of unsaturation as to be incompatible with respect to cure. As further illustration, butadiene-styrene copolymers and natural rubber are compatible as to rate of cure, but are incompatible physically due to the dissimilarity in molecular structure caused by the presence of aromatic rings but no methyl groups in the case of the butadiene-styrene copolymers in contrast to methyl groups but no aromatic rings in the case of natural rubber.

An outstanding advantage of the present invention is that both molecular structure and cure rate of the elastomer product is varied to correspond to the molecular structure and cure rate of the synthetic rubber with which it is blended. These variations may be accomplished by varying the proportions of the three monomeric constituents from which the elastomers are prepared. Thus, the ratio of alkyl side chains to chain carbon atoms in the product may be regulated by varying the proportion of iso-olefin used, the ratio of aryl side chains to chain carbon atoms likewise may be regulated by varying the proportion of the aryl compound, and the inherent curing rate may be controlled by adjusting the diolefin content so as to provide the desired degree of unsaturation. In applying the invention to the production of elastomers suitable for compounding with butadiene-styrene synthetics, the monomer containing an aryl group should be used in sufficient proportion to provide an aromatic ring content somewhat near that of the butadiene-styrene copolymers in order to ensure physical compatibility, and sufficient diolefin should be used to give a corresponding rate of cure.

According to this invention there is provided a method of tackifying and plasticizing a synthetic rubber having aromatic rings in the molecules thereof, which comprises forming a tackifier product characterized by tacky, elastic properties, by the presence of sufficient double bonds to impart to the product a chemical compatibility with said synthetic rubber in respect of rate of cure and by the presence of sufficient aromatic rings to impart compatibility with said synthetic rubber in respect of physical homogeneity on curing therewith, by copolymerizing a monomeric mixture comprising from about 50 to about 70 parts by weight of an iso-olefin of 4–6 carbon atoms having a double bond in the alpha position and a side chain in the beta position, from about 10 to about 30 parts by weight of an aliphatic 1,3-conjugated diolefin and from about 20 to about 30 parts by weight of an aryl-substituted vinyl compound, said copolymerization being effected at a temperature of from about $-40°$ C. to about $-160°$ C. with the aid of a polymerization catalyst, adapted to copolymerize said monomers at said temperature; correlating the proportion of said monomers in the monomeric mixture and the polymerizing conditions within the limits defined herein with a tackifier having said characteristics, effecting said polymerization to form said tackifier product; separating said product from the reaction mixture; and milling together a major proportion of said synthetic rubber and a minor proportion of said tackifier product thereby to impart tack and plasticity to the synthetic rubber blend.

The general procedure of preparing the copolymers employed in this invention comprises cooling a mixture of an isoolefin as defined herein which preferably is iso-butene, an aliphatic 1,3-conjugated diolefin such as butadiene or isoprene, and an aryl-substituted vinyl compound such as styrene to a sub-zero temperature which may be as low as or lower than minus 105° C., preferably although not necessarily in the presence of a diluent, and subjecting the cooled mixture to the catalytic action of a Friedel-Crafts type catalyst. Copolymerization of the monomers takes place rapidly with the liberation of heat, and means must be provided for absorbing the heat generated. This can be done most conveniently by employing a material such as a liquefied, normally gaseous hydrocarbon as diluent, and allowing it to vaporize and thus act as a refrigerant. After polymerization, the diluent and any unreacted monomers or low boiling reaction products are separated from the copolymers which have been formed. It is often desirable to add a petroleum fraction of lubricating oil consistency just before making this separation, as more particularly explained hereinafter, in which case the separated product will be a homogeneous mixture of copolymers and petroleum hydrocarbons. The product, comprising either copolymers or a mixture of copolymers and petroleum hydrocarbons as the case may be, is treated to destroy any admixed catalyst which, otherwise, might cause additional polymerization. This may be accomplished by mixing a relatively small proportion of water with the product and boiling off the water, thereby to hydrate the catalyst and yield a finished copolymer product. It also may be accomplished by stirring the copolymers with a large proportion of water in order to hydrate the catalyst and at the same time wash out the products of hydration, settling the resulting mixture at elevated temperature, and separately withdrawing the copolymer layer.

The solubility in the reaction mixture of the copolymers formed on polymerization depends largely on their molecular weight. Generally, low molecular weight copolymers tend to be soluble and to remain in solution after polymerization whereas copolymers having higher molecular weights are insoluble and therefore settle out as either a plastic or granular mass. Under some conditions a major portion of the copolymers separates from solution while in other cases all of the copolymers remain in solution, depending on the particular operating conditions employed and the type of material obtained. The copolymers therefore can be separated into fractions of high and low average molecular weights, if desired, by separating the solution from the insoluble material, the low molecular weight fraction being obtained from the separated solution by evaporation of the diluent and any other low boiling material such as unreacted monomers. This difference in solubility may be utilized to obtain two fractions differing in characteristics if desired. On the other hand, the operating conditions may be adjusted so as to give a single product, which may contain both relatively high and relatively low molecular weight materials but which has an average molecular weight such that the product has the characteristics desired.

The exact procedure and conditions to employ for any specific synthesis depends on the particular type of product desired. Of primary importance in determining the nature and character of product is, of course, the composition, which is controlled by varying the proportions of monomeric constituents. However, for any given composition, product characteristics may be varied to considerable extent by varying the degree of polymerization and thus the product molecular weight. Within reasonable limits of composition, the average molecular weight is a rough measure of the nature and character of product obtained, and it has been found to be controlled largely by the following processing variables:

(1) Monomer ratios in the charge
(2) Purity of the monomers and diluent
(3) Polymerization temperature
(4) The type and quantity of catalyst employed.

These are discussed in detail below but in general it may be stated that high molecular weight is favored by low temperature and pure components.

In the preparation of the copolymers employed in this invention, isobutene is preferred as the mono-olefinic component; however, other polymerizable iso-mono-olefins also may be used. In order to ensure sufficient capacity for polymerization, the mono-olefinic component should have the double bond in the alpha position and a side chain in the beta position as for example, 2-methyl-1-butene, 2-ethyl-1-butene, 2,3-dimethyl-1-butene, or the like. Moreover, iso-olefins of relatively high molecular weight, even though having the specified molecular structure, may be too unreactive to be of use in the synthesis of these novel elastomers. As the conjugated diolefin, either butadiene or isoprene is preferred although other dienes such as piperylene, conjugated hexadienes or chloroprene may be used. As the aryl-substituted vinyl compound, styrene is preferred but other aryl compounds such as substituted vinyl benzenes, vinyl naphthalene or the like also are useful.

The proportions of monomeric ingredients may be varied considerably, and such variation is of major importance in predetermining the product characteristics. For tackifier products the proportions generally may vary within the following ranges: from about 50 to about 70 parts of isobutene, from about 10 to about 30 parts of butadiene and from about 20 to about 30 parts of styrene. A relatively low isobutene content tends to cause the formation of thermoplastic products rather than elastomers. Increasing the butadiene content tends to decrease molecular weight and increase softness and tack provided the isobutene content is not too low; however at relatively low isobutene contents, say below 50% isobutene, increasing the proportion of butadiene at the expense of the isobutene tends to cause increased hardness, decreased tack and at sufficiently low isobutene content the formation of thermoplastic materials, apparently through cross-linking of molecules. Increasing the styrene content when a relatively small proportion is present also has the effect of decreasing molecular weight and increasing softness and tack to a minor extent, but at higher styrene contents causes a decrease in tack, an increase in apparent tensile strength of the uncured copolymer and a tendency toward the formation of thermoplastic rather than rubbery products. The following are particularly suitable formulas (given in parts by weight) for making tackifiers of varying character for butadiene-styrene synthetic rubber:

|  | Parts of Isobutene | Parts of Butadiene | Parts of Styrene |
|---|---|---|---|
| Formula I | 70 | 10 | 20 |
| Formula II | 60 | 10 | 30 |
| Formula III | 60 | 20 | 20 |
| Formula IV | 60 | 30 | 10 |
| Formula V | 50 | 20 | 30 |
| Formula VI | 50 | 30 | 20 |
| Formula VII | 50 | 40 | 10 |
| Formula VIII | 40 | 50 | 10 |

It is noted that analysis of the copolymer products by the best means now available indicates that the monomers on polymerization combine in at least nearly the same proportions as present in the charge. From this it might be inferred that the total yield of copolymers would be relatively independent of composition, and such has been found to be the case. The total yield of copolymers does show some variation, the yield usually ranging from about 70 per cent to about 98 per cent when a diluent is employed, but this appears to be due to variations in operating conditions such as rate of addition of catalyst, total time of polymerization or other factors relating to loss of monomers through evaporation and not to composition variations to any appreciable extent. However the yield of relatively high molecular weight copolymers, in contrast to yield of total copolymers, may be affected by variations in composition. For a given styrene content of the charge, the yield of copolymers of high molecular weight has been found to decrease sharply as the butadiene is increased. This is illustrated by the following data which show the yields of insoluble copolymers prepared under identical operating conditions with propane as the diluent:

| Composition of charge | | | Yield of insoluble elastomers, per cent on charge |
| --- | --- | --- | --- |
| Parts of isobutene | Parts of butadiene | Parts of styrene | |
| 80 | 10 | 10 | 71 |
| 70 | 20 | 10 | 52 |
| 60 | 30 | 10 | 35 |

Here, an increase in butadiene content from 10 parts to 30 parts caused the yield to drop from 71 per cent to 35 per cent. On the other hand, an increase in the styrene content while holding the butadiene content constant has an almost negligible effect on the yield, as illustrated by the following data:

| Composition of charge | | | Yield of insoluble elastomers, per cent on charge |
| --- | --- | --- | --- |
| Parts of isobutene | Parts of butadiene | Parts of styrene | |
| 80 | 10 | 10 | 71 |
| 70 | 10 | 20 | 70 |
| 60 | 10 | 30 | 69 |

In this case an increase in styrene content from 10 parts to 30 parts caused the yield to decrease only from 71 per cent to 69 per cent. It therefore is desirable, in manufacturing the insoluble or higher molecular weight type elastomers, to use as small a proportion of butadiene as would be consistent with obtaining the characteristics desired, in order to effect a high yield. On the other hand, the styrene content of the charge may be selected only on the basis of the characteristics imparted to the product and without regard to yield.

The presence of impurities in the monomers and diluent usually tends to cause the formation of the low molecular weight type of elastomers. In particular, the presence of substantial amounts of straight chain olefins having more than two carbon atoms results in a lower average molecular weight of the product. The presence of various other impurities such as sulfur compounds or phenolic constituents also causes lower molecular weights. Saturated paraffin hydrocarbons appear to have no effect on molecular weight. It should be understood, however, that the tendency for impurities to cause low molecular weight does not necessarily mean that pure components must be used in order to obtain useful elastomer type products, for the effect of even extremely large amounts of impurities in many cases may be compensated for by appropriate adjustment of other operating conditions. For instance, it has been discovered that a refinery $C_4$ fraction containing about 8 per cent butene-1, about 11 per cent butene-2 and only about 8 per cent isobutene may be used to supply the necessary isobutene content of a reaction mixture and that under suitable polymerization conditions a very good tackifier of the soft, sticky type may be obtained. Other $C_4$ fractions which contain appreciable although minor proportions of butadiene likewise may be used to supply this component. The fact that such impure components are at times permissible is of decided economic advantage.

The temperature at which the polymerization reaction is carried out has a pronounced effect on molecular weight of the product, the higher the temperature the lower being the average molecular weight for any given combination of monomers. At relatively high temperatures, such as say minus 20° C., the copolymer products usually are of sufficiently low molecular weight to have the appearance of sticky, viscous oils rather than elastomers or thermoplastic materials. At lower temperatures either rubbery or thermoplastic materials may be obtained.

As mentioned above, the preferred means of controlling the temperature comprises the addition of a diluent which by evaporating acts as an internal refrigerant. Usually 2–4 parts by weight of such diluent are used for each part of monomers in the reaction mixture. Various light, normally gaseous hydrocarbons are suitable diluents since they are inert and have the capacity for dissolving the monomers in required amounts. The particular hydrocarbons which may be employed and their boiling points are as follows:

|  | °C. |
| --- | --- |
| Methane | −161 |
| Ethylene | −104 |
| Ethane | −88 |
| Propane | −42 |

The use of one of these enables the reaction temperature to be maintained near the normal boiling point of the particular hydrocarbon chosen, or at other desired temperatures by adjusting the pressure under which the hydrocarbon is allowed to evaporate. Under atmospheric pressure the temperature may be maintained at one of the various temperature levels within the range of about minus 40° C. to about minus 160° C.

The lower the boiling point of the diluent used for any given ratio of monomers, the greater is the tendency toward the formation of tougher and less tacky products containing smaller proportions of low molecular weight copolymers. For example, with an isobutene:butadiene:styrene ratio of 60:20:20 and boron fluoride as the catalyst, propane as diluent under atmospheric pressure results in a soft and very tacky product, ethylene as a diluent results in a rather tough elastomer product having much less tack and a considerably smaller proportion of low molecular weight copolymers, and ethane as a diluent gives a product of intermediate average molecular weight and properties. It should be noted, however, that for any given temperature the product molecular weight and properties will vary considerably with the monomer ratios, and thus that it is possible by appropriate selection of charge compositions to obtain a product at some particular polymerization temperature that is substantially identical as regards plasticity and tack with a product obtained at another temperature. For instance, the product obtained from an isobutene: butadiene:styrene composition of 40:50:10 with propane as diluent evaporating under atmospheric pressure is very much like the product obtained from a composition of 50:30:20 with propane as diluent but cooled to minus 78° C., both products being rather tough but sticky elastomers. Obviously, however, the two products would differ in cure rate due to different degrees of unsaturation caused by the different butadiene contents.

It is noted that methane is an undesirable diluent, due to the exceedingly low temperature accompanying its use and the difficulty of handling; and that it usually is not required for obtaining the desired product characteristics, since the use of propane, ethane or ethylene with appropriate selection of catalyst and proportions of ingredients permits sufficient variance of product character.

The ease with which the temperature is controlled is not the only advantage resulting from the use of a diluent. Of possibly even more importance is the effect on the yield of elastomers; for a very substantial increase in the total amount of copolymers formed results from the use of a diluent. Total yields of 70–98 per cent based on the weight of monomers usually are obtained when a diluent is employed, whereas yields of only about 50 per cent are obtained under similar conditions but without a diluent.

There is a difference in the character of insoluble elastomers formed on the one hand with ethane and on the other hand with ethylene as diluent. In the case of ethane the copolymers precipitate as a tacky plastic mass, whereas with ethylene the precipitated copolymers are granular and have considerably less tack. This may be due to the difference in temperature obtained with the two diluents or possibly to the formation of a loosely combined complex of ethylene and boron trifluoride which results in an increase in concentration of effective catalyst present in the liquid phase. There is evidence that the ethylene in spite of its unsaturation is inert with respect to the polymerization reaction.

Although ethylene apparently is inert in the reaction mixture, propylene, on the other hand appears to take part in the copolymerization and acts as a "chain breaker," thereby preventing the formation of long chain molecules of high molecular weights. Thus, it has been found that when a crude grade of propane containing about 20 per cent propylene was used as the diluent under certain operating conditions, the copolymers had sufficiently low molecular weight to remain entirely in solution; whereas when pure propane was used under similar conditions, a major part of the copolymers had sufficiently high molecular weight to be insoluble.

As stated above, Friedel-Crafts type catalysts are utilized for effecting copolymerization of the monomers according to this invention. The preferred catalyst of this type is boron fluoride. In polymerizations carried out above the boiling point of ethylene, gaseous boron fluoride, preferably diluted with nitrogen or some other inert gas, may be injected into the reaction mixture or the reaction mixture may be sprayed into a vessel containing the gaseous boron fluoride. However, when ethylene is used as the diluent, it is preferable to dissolve the boron fluoride in an additional amount of ethylene and inject the thus formed solution of catalyst into the reaction mixture. This method of adding the catalyst simplifies the regulation of the addition rate and thus facilitates control of the rate of reaction. In addition to boron fluoride, aluminum chloride is also an effective catalyst. When the latter is used, however, it first must be dissolved in a suitable solvent, such as ethyl chloride, and the solution then injected into the reaction mixture. For the economic production of elastomers, it is essential that the ethyl chloride be recovered and reused; and since this presents considerable difficulty and necessitates an additional operating step, it is more convenient to use boron fluoride. Another advantage in using boron fluoride is that excessive amounts may be employed without impairing the quality of elastomer product obtained. Aluminum chloride is in some respects a more vigorous polymerizing catalyst than boron fluoride and, consequently, more difficultly controlled and if used in excessive amounts may result in the formation of brittle thermoplastic products rather than elastomers. The catalytic effects of boron fluoride and aluminum chloride seem to be more nearly equal at about minus 100° C. than at minus 40° C. Various other Friedel-Crafts type catalysts are known to be effective in promoting low temperature polymerization reactions and it is to be understood that these might be employed without departing from the scope of this invention. By Friedel-Crafts type catalysts is meant halides of the amphoteric metals including particularly $BF_3$, $AlCl_3$ and $SnCl_4$. Corresponding halogen acid addition compounds such as $HBF_4$ and $H_2SnCl_6$ also may be used but are not preferred.

The low molecular weight type of elastomers are extremely tacky materials which have a tendency to stick to the sides of the reaction vessel and, consequently, considerable difficulty often is experienced in withdrawing these materials and in the subsequent blending and compounding with butadiene-styrene synthetics. In order to obviate such difficulty a petroleum fraction of lubricating oil consistency may be added to the reaction mixture after the polymerization has been completed but before the diluent has been removed, as mentioned hereinabove. On evaporation of the diluent and any unreacted monomers a homogeneous mixture of elastomers and such petroleum fraction thereby may be obtained as product. This product, which has the appearance of a very viscous oil at ordinary temperatures, on warming becomes relatively fluid and then may be handled without difficulty. Furthermore, it has been found that by employing a specific type of petroleum fraction, a petroleum hydrocarbon-elastomer product may be obtained which is an excellent tackifier and plasticizer for butadiene-styrene copolymers. The type of petroleum fraction required for this purpose is one which frequently is used in the arts as a softener or plasticizer in the compounding of rubber, both synthetic and natural. Such softeners or plasticizers are derived from a naphthene base crude petroleum and preferably have a Saybolt Universal viscosity of about 150–160 seconds at 100° F. Petroleum fractions from sources other than naphthenic crudes generally fail to have sufficient compatibility with rubber to be of utility in applications of this type. A petroleum fraction, which is well known in the rubber industry as "Circo light processing oil," a naphthenic base oil having a Saybolt Universal viscosity at 100° F. of 150–160 seconds and an A. P. I. gravity of 20.2–22.5 at 60° F., and which is listed on page 310 of the Rubber Red Book, 1941 edition, is an example of the type of petroleum-derived softener or plasticizer preferred. Such softeners or plasticizers do not impart any substantial amount of tack to the butadiene-styrene type of synthetic rubber on being compounded therewith but merely act as plasticizing or softening agents. The viscous oily products obtained by using such specific petroleum fraction in the manner described above, however, may be used to impart both tack and plasticity or softness to the butadiene-styrene type of synthetic rubber. The tack and plasticity may be regulated as desired in the blend by varying the ratio of petroleum fraction to elastomers in these tackifier products and/or by varying the proportion of the tackifier incorporated with the butadiene-styrene synthetic. In preparing products of this type, it generally is preferable to add enough of the specified petroleum fraction to the reaction mixture after polymerization to give a product containing 25–50 per cent petroleum hydrocarbons, although larger or smaller proportions may be desirable at times. The product may be blended with butadiene-styrene copolymers in widely varying proportions, depending on the tack and plasticity desired in the finished blend. A proportion of about 20–30 parts of tackifier product to 70–80 parts of butadiene-styrene copolymers is preferred in making tire carcass stock, while a proportion of 10–20 parts to 80–90 parts of butadiene-styrene copolymers is preferred for tread stock. In compounding the elastomers prepared without the addition of a petroleum-derived softener or plasticizer, as much as 40 parts of elastomers to 60 parts of butadiene-styrene copolymers often are desirable, particularly in the preparation of hose type stocks.

The following examples, in which parts are by weight, illustrate various embodiments of the invention:

*Example I*

Three hundred parts of technically pure propane (containing no propylene) were charged as a pre-cooled liquid to a reaction vessel provided with a mechanical stirrer. A mixture of 70 parts of isobutene, 10 parts of butadiene and 20 parts of styrene was added to and mixed with the propane, and the temperature of the resulting mixture was adjusted to minus 78° C. and maintained approximately at this level by means of Dry Ice. While the mixture was being vigorously stirred, gaseous boron fluoride, diluted with nitrogen, was bubbled slowly therein to effect polymerization of the monomers. The addition of the catalyst was continued until the reaction apparently had stopped as judged by cessation of heat evolution. The lower molecular weight elastomers remained in solution while those of higher molecular weight precipitated as a plastic mass. Fifty parts of the petroleum fraction known as Circo light processing oil, referred to hereinabove, and having a S. U. viscosity of about 155 seconds at 100° F. was added to the mixture, which then was heated sufficiently to evaporate the propane and any unreacted monomers. A residue comprising a homogeneous mixture of 85 parts of elastomers and 50 parts of petroleum hydrocarbons and containing a small amount of catalyst was obtained. Ten parts of water were mixed with the residue, and the mixture was heated sufficiently to drive off the water. This destroyed the catalyst and yielded a finished elastomer product which was extremely viscous at room temperature.

The elastomer product or tackifier thus obtained was compounded with a butadiene-styrene copolymer, known in the trade as "Hycar OS-30," and other ingredients according to the following formula:

| | Parts |
|---|---|
| Butadiene-styrene rubber | 80 |
| Elastomer product | 20 |
| Zinc oxide | 5 |
| Medium thermal carbon black | 40 |
| Sulfur | 1¾ |
| Cyclohexyl amine salt of mercapto-benzothiazole | 1½ |

This blend was placed on fabric in a mold and cured at 290° F. for 45 minutes. On testing the cured blend for adhesion to the fabric, a value of 8 pounds per linear foot was obtained. A similiarly compounded and cured blend, containing 100 parts of "Hycar OS-30" but none of the elastomer product, had an adhesion of only 3 pounds per linear foot.

*Example II*

A pre-cooled mixture comprising 70 parts of isobutene, 10 parts of butadiene, 20 parts of styrene and 300 parts of crude propane containing approximately 20 per cent propylene was charged to a reaction vessel under atmospheric pressure. The propane was allowed to evaporate, thus acting as an internal refrigerant and thereby maintaining the temperature at approximately minus 40° C. Boron fluoride was bubbled into the mixture until no further heat evolution was evident. In this case all of the copolymers formed were of sufficiently low molecular weight to remain in solution. Twenty-five parts of Circo light processing oil were added and the propane and any unreacted monomers were boiled off, whereby a viscous homogeneous mixture comprising 90 parts of elastomers and 25 parts of petroleum hydrocarbons was obtained. The catalyst was hydrolyzed and the product dehydrated as in Example I.

Two blends of the elastomer product and "Hycar OS-30" were made, one having 20 parts of elastomer product blended according to the formula given in Example I and the other differing only in that 10 parts of elastomer product and 90 parts of "Hycar OS-30" were used. After curing on fabric at 290° F. for 45 minutes, the blends were found to have the following adhesions:

| | Adhesion, lbs. per linear foot |
|---|---|
| Blend containing 10 parts of elastomer product | 7 |
| Blend containing 20 parts of elastomer product | 15 |

*Example III*

The elastomer product or tackifier prepared as in Example II was compounded with butadiene-styrene copolymers and other ingredients, and the blend was cured for 40 minutes at 290° F. For comparison, two blends containing Circo light processing oil in place of the tackifier and also two blends containing neither tackifier nor Circo light processing oil were compounded and cured in like manner. The following formulas, showing parts by weight, were used:

|  | Blend containing no tackifier or softener | Blends containing tackifier | | Blends containing softener | |
|---|---|---|---|---|---|
| Butadiene-styrene rubber | 100 | 100 | 100 | 100 | 100 |
| Tackifier | 0 | 10 | 20 | 0 | 0 |
| Circo Light Processing Oil | 0 | 0 | 0 | 10 | 20 |
| Zinc oxide | 5 | 5 | 5 | 5 | 5 |
| Phenyl naphthyl amines accelerator | 1 | 1 | 1 | 1 | 1 |
| Sulfur | 1¾ | 1¾ | 1¾ | 1¾ | 1¾ |
| Cyclohexyl amine salt of mercaptobenzothiazole | 1½ | 1½ | 1½ | 1½ | 1½ |
| Easy processing channel black | 40 | 40 | 40 | 40 | 40 |

Both of the blends containing the tackifier milled considerably better than any of the other blends, this being true even of the blend containing only 10 parts of tackifier as compared with the one containing 20 parts of softener. The following test data were obtained on the blends after curing:

|  | Blend containing no tackifier or softener | Blends containing tackifier | | Blends containing softener | |
|---|---|---|---|---|---|
|  |  | 10 Parts | 20 Parts | 10 Parts | 20 Parts |
| Tensile strength, lbs./sq. in | 2,590 | 2,240 | 1,780 | 1,830 | 1,280 |
| Percent elongation | 475 | 470 | 505 | 410 | 470 |
| Modulus at 300% | 1,240 | 835 | 750 | 1,050 | 550 |
| Shore hardness | 55 | 50 | 48 |  |  |

As shown in the above tabulation, the elastomer product or tackifier does not cause as large a decrease in tensile strength as the softener does. For purposes to which cured products of this type would be put, such large decrease in tensile strength as caused by the softener are highly undesirable. On the other hand the tackifier has a much more beneficial effect than the softener or processing quality of the uncured stock.

Example IV

A mixture of monomers comprising 50 parts of isobutene, 20 parts of butadiene and 30 parts of styrene were cooled to approximately minus 70° C. by means of Dry Ice, no diluent being added in this case. A stream of boron fluoride diluted with nitrogen was bubbled slowly into the mixture while the mixture was being stirred and the temperature was being maintained substantially at minus 70° C. After the reaction was complete, volatile constituents in the reaction mixture were driven off by heating. Approximately 50 parts of a moderately rubbery residue having extreme tack was obtained. Water was added to hydrolyze the catalyst and the wet product then was dehydrated by hot milling.

The elastomers thus obtained were compounded with butadiene-styrene synthetic rubber and other ingredients and the resulting blend was cured at 290° F., thereby yielding a tread type stock. For comparison, a similar blend of the butadiene-styrene synthetic but containing no added elastomers was cured in like manner. The compounding formulas were as follows:

|  | Compound without elastomers | Compound with elastomers |
|---|---|---|
|  | Parts | Parts |
| Butadiene-styrene synthetic | 100 | 60 |
| Elastomers | 0 | 40 |
| Zinc Oxide | 5 | 5 |
| Circo Light Processing Oil | 5 | 5 |
| Easy processing channel black | 50 | 50 |
| Sulfur | 2½ | 2½ |
| Cyclohexylamine salt of mercaptobenzothiazole | 1½ | 1½ |

In compounding these, it was found that the blend without elastomers could be milled only with difficulty whereas the blend containing elastomers milled very satisfactorily. The following data were obtained on the cured compounds:

|  | Time of cure at 290° F., minutes | Tensile strength, lbs./sq. in. | Per cent elongation | Shore hardness |
|---|---|---|---|---|
| Without elastomers | 25 | 2,130 | 315 | 60 |
|  | 45 | 1,750 | 245 | 60 |
| With elastomers | 25 | 1,818 | 280 | 64 |
|  | 45 | 1,845 | 200 | 66 |

A comparison of tensile strengths shows that an appreciable decrease in this physical property with increasing time of cure occurred in the case of blends without elastomers, but that the blends with elastomers had the desirable characteristic of not exhibiting substantial change in tensile strength with time of cure.

Example V

A mixture comprising 50 parts of isobutene, 30 parts of butadiene and 20 parts of styrene dissolved in 400 parts of technically pure propane was subjected to polymerization at minus 78° C. by a procedure identical with that of Example I except that the boron fluoride was not diluted with nitrogen. After polymerization the propane and other low boiling components of the polymerized mixture were evaporated, no petroleum fraction being added in this case, and catalyst retained in the residue was destroyed in the usual manner. Eighty-seven parts of elastomer product resulted. This product was compounded with butadiene-styrene rubber and other ingredients by milling in the following proportions:

| Butadiene-styrene rubber | 75 |
|---|---|
| Elastomers | 25 |
| Zinc oxide | 5 |
| Phenyl naphthyl amines accelerator | 1 |
| Sulfur | 1¾ |
| Cyclohexyl-amine salt of mercaptobenzothiazole | 1½ |
| Medium soft carbon black | 50 |

By virtue of the presence of the elastomers, the blend milled very satisfactorily and had good tack and plasticity. Portions of the blend were cured at 290° F. for various lengths of time, after which the following test data were obtained:

|  | Time of curing, minutes | | | |
|---|---|---|---|---|
|  | 20 | 35 | 50 | 70 |
| Tensile strength, lbs./sq. in | 1,228 | 1,066 | 1,220 | 1,227 |
| Percent elongation | 803 | 712 | 728 | 328 |
| Modulus at 300% elongation | 297 | 356 | 353 | 740 |

These tests show that the cured blend satisfactorily meets requirements for tire carcass stock.

Example VI

A crude C₄ fraction having the following composition by weight:

| | Percent |
|---|---|
| Propylene | 3.0 |
| Propane | 8.7 |
| n-Butane | 16.3 |
| Isobutane | 45.1 |
| Isobutene | 8.2 |
| Butene-1 | 7.7 |
| Butene-2 | 10.8 |
| Pentane and heavier | 0.2 |
| Total | 100.0 | was used to supply the isobutene for a charge mixture having an isobutene: butadiene: styrene ratio of 60:20:20 and comprising 732 parts of crude C₄ fraction, 20 parts of butadiene and 20 parts of styrene. Three hundred parts of propane were added as diluent, and the mixture was polymerized by means of BF₃ at a temperature of minus 78° C., maintained by using Dry Ice. The product, which was obtained from the reaction mixture as in previous examples, comprised 89 parts of soft, sticky elastomers suitable as a tackifier. The material was found to be practically identical with the product obtained by polymerizing a 60:20:20 mixture of pure monomers at a temperature of minus 40° C.

I claim:

1. A composition of matter comprising a mixture of a preponderant proportion of a synthetic rubber, made by polymerization of a mixture consisting essentially of butadiene and styrene, and a minor proportion, effective to impart tack thereto, of a tacky, elastic tackifier copolymer product derived by polymerization, at a temperature of from about −40° C. to about −160° C. with the aid of a Friedel-Crafts type catalyst, of a monomeric mixture comprising from about 50 to about 70 parts by weight of an iso-mono-olefin of 4–6 carbon atoms having a double bond in the alpha position and a side chain in the beta position, from about 10 to about 30 parts by weight of an aliphatic 1,3 conjugated diolefin and from about 20 to about 30 parts by weight of styrene.

2. A composition of matter comprising a mixture of a preponderant proportion of a synthetic rubber, made by polymerization of a mixture consisting essentially of butadiene and styrene, and a minor proportion, effective to impart tack thereto, of a tacky elastic tackifier copolymer product derived by polymerization, at a temperature of from about −40° C. to about −160° C. with the aid of a Friedel-Crafts type catalyst, of a monomeric mixture comprising from about 50 to about 70 parts by weight of isobutene, from about 10 to about 30 parts by weight of butadiene and from about 20 to about 30 parts by weight of styrene.

3. A composition of matter comprising a mixture of a preponderant proportion of a synthetic rubber, made by polymerization of a mixture consisting essentially of butadiene and styrene, and a minor proportion, effective to impart tack thereto, of a tacky elastic tackifier copolymer product derived by polymerization, at a temperature of from about −40° C. to about −160° C. with the aid of a Friedel-Crafts type catalyst, of a monomeric mixture comprising from about 50 to about 70 parts by weight of isobutene, from about 10 to about 30 parts by weight of isoprene and from about 20 to about 30 parts by weight of styrene.

STEWART S. KURTZ, Jr.

REFERENCES CITED

The following references are of record in the file of this patent:

UNITED STATES PATENTS

| Number | Name | Date |
|---|---|---|
| 2,023,495 | Thomas | Dec. 10, 1935 |
| 2,438,340 | Johnson | Mar. 23, 1948 |

FOREIGN PATENTS

| Number | Country | Date |
|---|---|---|
| 513,521 | Great Britain | Oct. 16, 1936 |
| 106,371 | Australia | Jan. 10, 1939 |
| 705,104 | Germany | Apr. 17, 1941 |